US012630434B2

(12) United States Patent
Chen et al.

(10) Patent No.: US 12,630,434 B2
(45) Date of Patent: May 19, 2026

(54) EXTRA-LARGE PORE MOLECULAR SIEVE ZEO-1, ITS SYNTHESIS AND USE

(71) Applicant: JILIN JINOBEL SCIENCE AND TECHNOLOGY INNOVATION CO., LTD., Changchun (CN)

(72) Inventors: Feijian Chen, Hefei (CN); Zihao Rei Gao, Hefei (CN); Jian Li, Hefei (CN)

(73) Assignee: JILIN JINOBEL SCIENCE AND TECHNOLOGY INNOVATION CO., LTD., Changchun (CN)

(*) Notice: Subject to any disclaimer, the term of this patent is extended or adjusted under 35 U.S.C. 154(b) by 464 days.

(21) Appl. No.: 18/253,748

(22) PCT Filed: Nov. 8, 2021

(86) PCT No.: PCT/CN2021/129234
§ 371 (c)(1),
(2) Date: May 19, 2023

(87) PCT Pub. No.: WO2022/111261
PCT Pub. Date: Jun. 2, 2022

(65) Prior Publication Data

US 2023/0416102 A1 Dec. 28, 2023

(30) Foreign Application Priority Data

Nov. 26, 2020 (CN) ......................... 202011346698.4
Oct. 28, 2021 (CN) ......................... 202111262220.8

(51) Int. Cl.
*C01B 39/48* (2006.01)
*B01J 29/89* (2006.01)
(Continued)

(52) U.S. Cl.
CPC ............... *C01B 39/48* (2013.01); *B01J 29/89* (2013.01); *B01J 37/0018* (2013.01);
(Continued)

(58) Field of Classification Search
USPC .................................................. 423/700, 702
See application file for complete search history.

(56) References Cited

U.S. PATENT DOCUMENTS 7,527,282 B2 5/2009 Corma et al.
7,527,782 B2 5/2009 Corma et al.
(Continued)

FOREIGN PATENT DOCUMENTS

CA 2201925 12/2024
CN 1161679 10/1997
(Continued)

OTHER PUBLICATIONS

Machine translation of CN 107892308 A (Year: 2018).*
(Continued)

*Primary Examiner* — Coris Fung
*Assistant Examiner* — Remy Frederic Lalisse
(74) *Attorney, Agent, or Firm* — Kilpatrick Townsend and Stockton LLP

(57) ABSTRACT

Provided are a ZEO-1 silicate molecular sieve having a new structure, a synthesis method therefor and the use thereof. An X-ray powder diffraction feature, a pore channel system and a topology feature of the ZEO-1 molecular sieve are characterized. Further, titanium atoms are successfully introduced in the framework of the ZEO-1 molecular sieve. The ZEO-1 molecular sieve of the present invention has a good thermal stability and can be used as an adsorbent or a catalyst.

15 Claims, 7 Drawing Sheets

(51) Int. Cl.

| | |
|---|---|
| ***B01J 37/00*** | (2006.01) |
| ***B01J 37/02*** | (2006.01) |
| ***B01J 37/03*** | (2006.01) |
| ***B01J 37/06*** | (2006.01) |

(52) U.S. Cl.

CPC ........... *B01J 37/0236* (2013.01); *B01J 37/03* (2013.01); *B01J 37/06* (2013.01); *B01J 2229/183* (2013.01); *C01P 2002/72* (2013.01); *C01P 2004/03* (2013.01)

(56) References Cited

U.S. PATENT DOCUMENTS

| | | | |
|---|---|---|---|
| 2007/0043249 | A1 | 2/2007 | Cao |
| 2015/0132215 | A1 | 5/2015 | Bull |
| 2017/0001873 | A1 | 1/2017 | Yang |

FOREIGN PATENT DOCUMENTS

| | | | | | |
|---|---|---|---|---|---|
| CN | 101148260 | | | 3/2008 | |
| CN | 101148260 | A | | 3/2008 | |
| CN | 101172238 | A | | 5/2008 | |
| CN | 101696019 | | | 4/2010 | |
| CN | 101696019 | A | | 4/2010 | |
| CN | 104370296 | | | 2/2015 | |
| CN | 104370296 | A | | 2/2015 | |
| CN | 104511271 | | | 4/2015 | |
| CN | 104511271 | A | | 4/2015 | |
| CN | 105217651 | | | 1/2016 | |
| CN | 105217651 | A | | 1/2016 | |
| CN | 106276948 | | | 1/2017 | |
| CN | 106673009 | | | 5/2017 | |
| CN | 106673009 | A | | 5/2017 | |
| CN | 107892308 | A | * | 4/2018 | ............ C01B 39/38 |
| CN | 107892309 | | | 4/2018 | |
| CN | 107892309 | A | | 4/2018 | |
| CN | 108275694 | | | 7/2018 | |
| CN | 108275694 | A | | 7/2018 | |
| CN | 108408736 | A | * | 8/2018 | ............ C01B 39/24 |
| CN | 108821304 | | | 11/2018 | |
| CN | 109195911 | | | 1/2019 | |
| CN | 109195911 | A | | 1/2019 | |
| CN | 111348662 | | | 6/2020 | |
| CN | 111348662 | A | | 6/2020 | |
| EP | 1401764 | | | 10/2005 | |
| JP | 09-077511 | | | 3/1987 | |
| JP | 2004-530620 | | | 10/2004 | |
| JP | 2013-511462 | | | 4/2013 | |
| JP | 2016-536240 | | | 11/2016 | |
| JP | 2018197170 | | | 12/2018 | |
| JP | 2018197170 | A | | 12/2018 | |
| WO | 2022111261 | | | 6/2022 | |

OTHER PUBLICATIONS

Machine translation of CN 108408736 A (Year: 2018).*

Moon, D. J., et al., Structure of a cyclohexane sorption complex of partially dehydrated, fully Mn2+-exchanged zeolite Y (Fau, Si/Al= 1.56). Microporous and Mesoporous Materials. (Year: 2018).*

Machine translation of CN 101696019 A (Year: 2010).*

Machine translation of CN 104511271 A (Year: 2017).*

Machine translation of CN 101148260 A (Year: 2008).*

Machine translation of CN 107892309 A (Year: 2018).*

Machine translation of CN 108821304 A (Year: 2020).*

Machine translation of CN 111348662 A (Year: 2020).*

Machine translation of CN 105217651 A (Year: 2016).*

International Search Report and Written Opinion received in PCT/CN2021/129234, dated Jan. 30, 2022, 7 pages. (English Translation).

Guo, et al., 'Synthesis and Crystallization Process of Polymorph A Enriched Beta Zeolite in the Presence of Two New Quaternary Ammonium Bases', Chemical Journal of Chinese Universities, 2014, vol. 35, No. 7, pp. 1363-1368. (with Abstract).

Wang, et al., 'Controllable direct-syntheses of delaminated MWW-type zeolites', Chinese Journal of Catalysis, 2020, vol. 41, pp. 1062-1066.

Japanese Patent Application No. 2023-532663, dated Jul. 3, 2024.

Chinese Office Action received in Chinese Patent Application No. 202111262220.8, dated Dec. 3, 2024, 8 pages.

European Search Report received in EP21896762.8, dated Feb. 17, 2025, 10 pages.

Dorset, et al., 'P-Derived Organic Cations as Structure-Directing Agents: Synthesis of a High-Silica Zeolite (ITQ-27) with a Two-Dimensional 12-Ring Channel System', J. Am. Chem. Soc, 2006, 128, pp. 862-8867.

Jiang, et al., 'Extra-Large-Pore Zeolites: Bridging the Gap between Micro and Mesoporous Structures', Angew. Chem. Int. Ed., 2010, 49, pp. 3120-3145.

Lin, et al., 'A stable aluminosilicate zeolite with intersecting three-dimensional extra-large pores', Science, 2021, 374, pp. 1605-1608. Molecular Sieve Synthesis', International Academic Trends, Department of 200433, 1998, pp. 531-536.

Quanzhi, et al., 'New Advances in Molecular Sieve Synthesis', International Academic Trends, Department of Chemistry, Fudan University, Shanghai 200433, 1998, pp. 531-536.

International Search Report received in the parent International Patent Application No. PCT/CN2021/129234, dated Jan. 30, 2022, 3 pages.

Zhendong Wang et al. "Controllable direct-syntheses of delaminated MWW-type zeolites,", Chinese Journal of CatalysiJ , vol. 41, No. 7, Jul. 31, 2020 (Jul. 31, 2020), pp. 1062-1066.

Guo, et al., "Synthesis and Crystallization Process of Polymorph A Enriched Beta Zeolite in the Presence of Two New Quaternary Ammonium Bases)", Journal of Chinese Universities, vol. 35. No. 7, Aug. 7, 2014 (2014-08-0 pp. 1363-1368.

* cited by examiner

EXTRA-LARGE PORE MOLECULAR SIEVE ZEO-1, ITS SYNTHESIS AND USE

TECHNICAL FIELD

The present invention relates to a silicate molecular sieve ZEO-1 with extra-large pores, and further relates to a synthesis method therefor, a molecular sieve composition comprising the molecular sieve and use thereof.

BACKGROUND ART

Molecular sieve materials are a category of inorganic microporous solid materials constituted by $TO_4$ (T represents an oxidation state atom with a valence of +4 or +3 under normal circumstances, such as Si, P, Al, B, Ge, Ga, etc.; T atom means a tetrahedral atom, i.e., a skeletal atom that participates in the skeleton of the molecular sieve) tetrahedrons via common vertexes. In general, the composition of a molecular sieve can be represented by the following empirical chemical formula: $x(M_{1/n}AO_2):yYO_2:zR:qH_2O$, where M represents one or more organic or inorganic cations having a valence of +n; A represents one or more trivalent elements; Y represents one or more tetravalent elements, usually Si; R represents one or more organic molecules. For a molecular sieve with specific structure obtained by a specific synthesis method, no matter whether it is a freshly synthesized product or a sample after calcination treatment, its chemical composition usually possesses a specific range of variation. In addition, X-ray powder diffraction (XRD) generally is used to distinguish a molecular sieve with specific structure, because different crystallographic structures of molecular sieves possess different channel structures and completely different diffraction patterns will be obtained in the X-ray powder diffraction patterns. The most important properties of molecular sieves are their variable channel chemical composition, adjustable channel size and channel shape. These excellent properties endow molecular sieve materials with a wide range of applications in fields of adsorption, separation, catalysis, microelectronics, and medical diagnosis.

The uniqueness of molecular sieve materials of different structures is reflected in their unique X-ray powder diffraction patterns and different chemical compositions. The position, relative intensity and width of the peaks in X-ray powder diffraction patterns are related to the chemical composition, crystal size and crystal shape, etc., and the X-ray powder diffraction patterns of different samples may also be influenced by the variation in unit cell parameters, caused slightly difference in the patterns. In addition, the uniqueness of molecular sieve materials of different structures can also be reflected in their unique topological properties. According to the definition and interpretation by the International Zeolite Association, Structure Commission, for a specific molecular sieve topological framework, the coordination sequences and vertex symbols are unique when combined, that is, they can be used to clearly distinguish different molecular sieve framework structures (See the official website of the International Molecular Sieve Association https://europe.iza-structure.org/IZA-SC/DatabaseHelp_Structures.html#CS). For the molecular sieves such as commonly known Linde Type A (Zeolite A, see U.S. Pat. No. 2,882,243), Zeolite Y (see U.S. Pat. No. 3,130,007), ZSM-11 molecular sieve (see U.S. Pat. No. 3,709,979), ZSM-12 molecular sieve (see U.S. Pat. No. 3,832,449), etc., they all possess distinct X-ray diffraction patterns.

Meanwhile, zeolites with the same structure generally have the same XRD patterns. However, two zeolite materials with similar XRD patterns and the same structure may be considered as different materials when the framework elements differ. Typical examples are molecular sieves TS-1 (see U.S. Pat. No. 4,410,501) and ZSM-5 (see U.S. Pat. No. 3,702,886), which both possess MFI topological structure. They are two different molecular sieve materials due to different framework elements, though they have the same XRD patterns. Specifically, ZSM-5 molecular sieve contains Si and Al as the framework elements so it is mainly used in the field of acid catalysis; while TS-1 molecular sieve contains Si and Ti in the framework, and it is mainly used as catalyst during the oxidation process.

In addition, those with the same topological structure, i.e., the same XRD pattern, and the same types of framework elements, but with different relative contents of framework elements, also may belong to different molecular sieves. For example, Zeolite X (see U.S. Pat. No. 2,882,244) and Zeolite Y (see U.S. Pat. No. 3,130,007) are considered as different molecular sieve materials, which both possess FAU topological structure, have the same XRD pattern, and contain Si and Al as the framework elements, but differ in the relative contents of Si and Al.

According to the ring number of the channels, molecular sieve materials can be divided into small pore, medium pore, large pore, and extra-large pore molecular sieves, corresponding to the window ring equal or less than 8-membered ring, equal or less than 10-membered ring, equal or less than 12-membered ring and greater than 12-membered ring. The channel size of molecular sieve materials that have been successfully applied in industry is usually below 1 nm, which has greatly limited the molecular size and shape of the reaction substrates in the adsorption, separation, and catalysis processes, and has become a constraint in the practical application of molecular sieve materials. It has always been a great challenge for inorganic chemists to develop and obtain stable extra-large pore molecular sieves with channels diameter ranging from 1 nm to 2 nm and even mesoporous molecular sieves. This class of materials will open the door to new catalytic applications in fields such as petrochemistry, fine chemicals, and life science.

Because of the stability of silicate materials, silicate extra-large pore molecular sieve materials have important application prospects. However, it is well known that the large pore and extra-large pore silicate molecular sieves are very difficult to obtain, and the already synthesized silicate molecular sieve materials containing an extra-large pore channel structure are very limited in number. Up to now, there are no more than 20 types of extra-large pore silicate molecular sieve materials with greater than 16-membered ring (including 16 membered-ring), such as 30-membered ring ITQ-37 [J. Sun et. al., *Nature,* 2009, 458, 1154-1157], 28-membered ring ITQ-43 [J. Jiang et. al., *Science,* 2011, 333, 1131-1134] and 18-membered ring ITQ-33 [A. Corma et. al., *Nature* 2006, 443, 842-845], NUD-1 [F.-J. Chen et. al., *Angew. Chem. Int. Ed.* 2014, 53, 9592-9596] and ECR-34 [K. G. Strohmaier et. al., *J. Am. Chem. Soc.* 2003, 125, 16035-16039] and so on, while most of these mentioned materials are germanosilicate molecular sieves. It is the fact that in addition to high price, the germanosilicate molecular sieves will adsorb water and then cause the framework collapse rapidly after the removal of the organic matters in the channels, which seriously limits its large-scale industrial application.

The molecular sieves that are widely industrialized or have industrial catalytic applications are all molecular sieves having multi-dimensional channels, such as ZSM-5, Zeolite Y, Zeolite A, etc. Up to now, among all the novel molecular sieves with known structures that have been reported, all stable, pure-silica or high-silica extra-large pore molecular sieves do not have multi-dimensional extra-large pore channels; all molecular sieves containing multi-dimensional extra-large pores are always germanosilicate zeolites or aluminophosphate molecular sieve materials, where their stability and high cost limit their applications.

WO2013019462A1 discloses a synthetic extra-large pore silicate molecular sieve EMM-23 and its synthesis method. The method uses diquaternary ammonium cation for synthesis to obtain a material with pure-silica framework, and the open channel of EMM-23 is of adjustable 21- to 24-membered ring. However, this structure contains Si—OH (silanol groups), which affects the available volume of its pores and reduces the structure stability.

U.S. Pat. No. 5,489,424 discloses an extra-large pore silicate molecular sieve UTD-1 and its preparation method, wherein its organic structure-directing agent is a complicated metal complex (bis(pentamethylcyclopentadienyl) cobalt cation). U.S. Pat. No. 6,043,179 discloses an extra-large pore silicate molecular sieve CIT-5 and its preparation method, wherein its organic structure-directing agent is a complicated drug derivative (methylsparteinium cation). These two materials have not been widely used in industry because of the following two defects: (1) these two zeolite structures only contain one-dimensional 14-membered ring channels, which do not meet the requirements of multi-dimensional channels needed for industrial catalysis; (2) the organic templates used for the synthesis of these two materials are extremely expensive, thus increasing the cost of commercialization.

CN104370296A discloses an extra-large pore silicate molecular sieve NUD-1 and its synthesis method. This zeolite structure shows that double four-membered rings, three-membered rings and double three-membered rings are alternately connected, respectively, thereby forming a channel structure in which ten-membered rings and twelve-membered rings exist alternately, and these two channels are intersected with 18-membered ring channels, respectively. However, the molecular sieve is a germanium-containing molecular sieve.

Therefore, there is a need for germanium-free, low-cost, and stable silicate molecular sieve materials with multi-dimensional extra-large pores.

On the other hand, titanosilica molecular sieve is a new type of molecular sieves containing heteroatoms developed since the early 1980s. At present, the known titanosilicate zeolites are TS-1 with MFI structure, TS-2 with MEL structure, Beta zeolite Ti-Beta, as well as mesoporous materials Ti-MCM-41 and Ti-MCM-48, etc. This type of molecular sieves has excellent catalytic activity and specific oxidation performance for many organic oxidation reactions, such as the olefins epoxidation, hydroxylation of aromatics, oximation of cyclohexanone, oxidation of alcohols and so on. They have important application value in industry as redox molecular sieve catalysts. Taking TS-1 as an example, Marco Taramasso et al., from Italy, first disclosed its preparation method in 1981 (see GB2071071A, U.S. Pat. No. 4,410,501). It not only has a good catalytic oxidation effect on organic compounds by the titanium atoms in this zeolite, but also has a shape-selective effect of ZSM-5 molecular sieve with high stability. In the oxidation reaction of organic matter that TS-1 participates in, low concentration hydrogen peroxide can be used as the oxidant with good selectivity, which can avoid the problems such as industrial complexity and environmental pollution in the conventional oxidation process and achieve the unparalleled advantages of energy saving and environmental protection, compared with traditional oxidation systems. According to the research from Li Can et al. from Dalian Institute of Chemical Physics in China, a direct evidence of the framework Ti atoms is the absorption peak at about 220 nm in the ultraviolet-visible absorption spectrum, indicating the tetra-coordinated Ti atoms in zeolite framework (see Angew. Chem. Int. Ed., 1999, 38, 2220-2222), which are the active centers during the catalysis.

The pore sizes of TS-1 and TS-2 are about 5.5 angstroms, and 6.5 angstroms for Ti-Beta. To have a good shape-selectivity, the size of the reactant molecules should be smaller than zeolite pore size, which severely limits the further application of the mentioned zeolite materials. Meanwhile, generally, Ti-MCM-41 and Ti-MCM-48 only have an adjustable mesopores of 15-100 angstroms sizes. Hence, titanosilicate zeolite materials containing 7-15 angstroms micropores are missing but needed, which is exactly the range of the molecular size of numerous high-value chemicals.

DISCLOSURE OF THE INVENTION

In the first aspect, the present invention provides a brand new extra-large pore silicate molecular sieve ZEO-1. It is a germanium-free, high-silica or pure-silica extra-large pore molecular sieve material, which not only has very important practical application value, but also is of very important theoretical significance for enriching the molecular sieve structure family. The super-macroporous silicate molecular sieve of the present invention not only adds a new member to the family of super-macroporous molecular sieve materials, but also provides a new choice for the use of such molecular sieve materials in industrial catalysis. In addition, titanium atoms were successfully introduced into the framework of zeolite ZEO-1 in the present invention, fills in the gap in the field of titanosilicate extra-large pore zeolites, provides a new choice for the use of molecular sieve materials in industrial catalysis, and has important practical application value.

The ZEO-1 molecular sieve of the present invention has a chemical composition of $(TiO_2)_y\cdot(HAO_2)_x\cdot SiO_2$, wherein A is a boron group element, preferably Al or B; $0\le x\le 1.0$, preferably $0\le x\le 0.5$, more preferably $0\le x<0.2$, most preferably $0.01\le x\le 0.1$; $0\le y<0.2$, preferably $0.01\le y\le 0.1$.

The framework of the molecular sieve has the topological characteristics shown in Table 1 below.

TABLE 1

| topological characteristics of the framework of ZEO-1 molecular sieve | | | | | | | | | | | | | |
|---|---|---|---|---|---|---|---|---|---|---|---|---|---|
| T atom | Coordination sequences | | | | | | | | | | | | |
| No. | N1 | N2 | N3 | N4 | N5 | N6 | N7 | N8 | N9 | N10 | N11 | N12 | Vertex symbols |
| T1 | 4 | 12 | 17 | 27 | 42 | 62 | 85 | 109 | 136 | 161 | 205 | 247 | 5.5.5.6.5(2).12(4) |
| T2 | 4 | 11 | 18 | 28 | 40 | 62 | 80 | 101 | 131 | 166 | 206 | 258 | 4.5(2).5.5.5.6 |
| T3 | 4 | 9 | 16 | 26 | 41 | 59 | 80 | 106 | 132 | 159 | 201 | 250 | 4.5.4.5.4.12(2) |
| T4 | 4 | 10 | 20 | 29 | 40 | 60 | 88 | 109 | 128 | 166 | 214 | 256 | 4.6.4.12(5).5.6(2) |
| T5 | 4 | 11 | 16 | 25 | 43 | 60 | 84 | 115 | 139 | 161 | 196 | 242 | 4.5.5.6.5.12(4) |
| T6 | 4 | 11 | 18 | 26 | 40 | 63 | 87 | 105 | 128 | 164 | 204 | 250 | 4.5(2).5.6(2).6.6(2) |
| T7 | 4 | 11 | 18 | 28 | 43 | 61 | 80 | 105 | 138 | 165 | 207 | 251 | 4.6(2).5.6.5.12(6) |
| T8 | 4 | 10 | 20 | 29 | 41 | 59 | 85 | 111 | 136 | 170 | 202 | 243 | 4.6.4.12(5).5.5 |
| T9 | 4 | 11 | 18 | 26 | 40 | 60 | 88 | 113 | 132 | 158 | 196 | 250 | 4.5(2).5.5.5.6 |
| T10 | 4 | 10 | 20 | 30 | 45 | 56 | 79 | 100 | 134 | 174 | 213 | 259 | 4.6.4.12(6).5.5 |
| T11 | 4 | 9 | 17 | 29 | 40 | 58 | 81 | 108 | 141 | 167 | 197 | 238 | 4.4.4.12(5).5.5 |
| T12 | 4 | 9 | 16 | 25 | 39 | 59 | 84 | 116 | 139 | 156 | 194 | 237 | 4.5.4.5.4.16(7) |
| T13 | 4 | 9 | 16 | 25 | 39 | 60 | 85 | 112 | 135 | 157 | 196 | 244 | 4.5.4.6(2).4.12(2) |
| T14 | 4 | 9 | 16 | 25 | 39 | 61 | 88 | 113 | 140 | 168 | 191 | 231 | 4.4.4.6(2).5.16(5) |
| T15 | 4 | 9 | 17 | 28 | 40 | 60 | 85 | 106 | 130 | 163 | 204 | 251 | 4.4.4.12(5).5.6(3) |
| T16 | 4 | 9 | 17 | 30 | 43 | 58 | 73 | 102 | 135 | 167 | 205 | 258 | 4.4.4.12(6).5.5 |
| T17 | 4 | 9 | 16 | 26 | 41 | 62 | 83 | 103 | 132 | 168 | 203 | 247 | 4.4.4.6(2).5.16(5) |
| T18 | 4 | 9 | 16 | 25 | 39 | 63 | 90 | 110 | 132 | 165 | 200 | 240 | 4.4.4.6(2).6(3).16(4) |
| T19 | 4 | 12 | 19 | 30 | 42 | 65 | 76 | 100 | 132 | 175 | 220 | 248 | 5.5.5(2).12(7).6.6 |
| T20 | 4 | 12 | 15 | 24 | 42 | 60 | 92 | 120 | 133 | 155 | 188 | 250 | 5.5.5.5.5(2).16(8) |
| T21 | 4 | 10 | 16 | 25 | 44 | 61 | 78 | 108 | 143 | 163 | 196 | 244 | 4.4.6.6.6(2).12(5) |

T1 to T21 represent the 21 topologically distinct T atoms of the structure of the extra-large pore zeolite ZEO-1 of the present invention; N1 to N12 represent the coordination sequences of these T atoms from the first shell to the twelfth shell. Due to the different order of naming of T atoms, the 21 topologically independent T atoms named in a different order may not correspond one-to-one to the coordination sequences and vertex symbols of the T atoms in the order in this table, but the structures belonging to the ZEO-1 topology all include and only include the coordination sequences and vertex symbols of the 21 topologically independent T atoms in this table, and the coordination sequences and vertex symbols correspond one-to-one.

The crystallographic structure of the molecular sieve has a three-dimensional intersecting channel system of (16+12)×(16+12)×(16+12)-membered rings.

The molecular sieve has the X-ray powder diffraction characteristics shown in Table 2 below:

TABLE 2

| X-ray powder diffraction characteristics of ZEO-1 molecular sieve (without introducing titanium) | |
|---|---|
| d-Spacing (Å) | Relative intensity |
| 21.64 ± 0.27 | m |
| 15.33 ± 0.13 | w |
| 12.62 ± 0.09 | vs |
| 10.87 ± 0.07 | w |
| 8.25 ± 0.04 | m |
| 7.95 ± 0.04 | w |
| 7.23 ± 0.03 | mw |
| 6.85 ± 0.03 | w |
| 6.28 ± 0.02 | w |
| 6.00 ± 0.02 | w |
| 5.41 ± 0.02 | w |
| 5.20 ± 0.02 | w |
| 5.12 ± 0.01 | w |
| 5.00 ± 0.01 | w |
| 4.75 ± 0.01 | w |
| 4.75 ± 0.01 | w |
| 4.61 ± 0.01 | mw |
| 4.35 ± 0.01 | mw |
| 4.22 ± 0.01 | w |

TABLE 2-continued

| X-ray powder diffraction characteristics of ZEO-1 molecular sieve (without introducing titanium) | |
|---|---|
| d-Spacing (Å) | Relative intensity |
| 4.11 ± 0.01 | s |
| 4.04 ± 0.01 | w |
| 3.90 ± 0.01 | mw |
| 3.74 ± 0.01 | w |
| 3.57 ± 0.01 | w |
| 3.53 ± 0.01 | w |
| 3.48 ± 0.01 | w |
| 3.47 ± 0.01 | w |
| 3.42 ± 0.01 | w |
| 3.36 ± 0.01 | w |
| 3.32 ± 0.01 | mw |
| 3.10 ± 0.01 | w |
| 3.10 ± 0.01 | w |
| 3.02 ± 0.01 | w |
| 2.90 ± 0.01 | w |
| 2.78 ± 0.01 | w |
| 2.17 ± 0.01 | w |

In the above data, w, mw, m, s and vs represent relative intensity of diffraction peaks, w is weak, mw is moderately weak, m is medium, s is strong, vs is very strong, which are known to those skilled in the art. Generally speaking, w is less than 10, mw is 10-20, m is 20-40, s is 40-70, and vs is greater than 70.

In the second aspect, the present invention further provides a method for preparing ZEO-1 molecular sieve, the method comprising:

(1) mixing a silicon source, a boron group element compound, an organic template, water, a mineralizer and optionally a titanium source to obtain a synthesis mixture;

(2) crystallizing the mixture;

(3) calcining the crystallized product to remove the template, wherein the organic template has a tetrahedral spatial configuration represented by the following general formula:

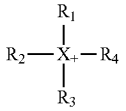

wherein, $R_1$ is cyclohexyl; $R_2$ and $R_3$ are phenyl or cyclohexyl; $R_4$ is $C_{1-8}$ alkyl, preferably $C_{1-4}$ alkyl, more preferably $C_{1-2}$ alkyl; X is phosphorus or nitrogen, preferably phosphorus.

In the third aspect, the present invention further provides a molecular sieve composition, which comprises the ZEO-1 molecular sieve of the present invention and a binder.

In the fourth aspect, the molecular sieve composition of the present invention can be used as an adsorbent or a catalyst.

DETAILED DESCRIPTION OF THE INVENTION

Figure 4:
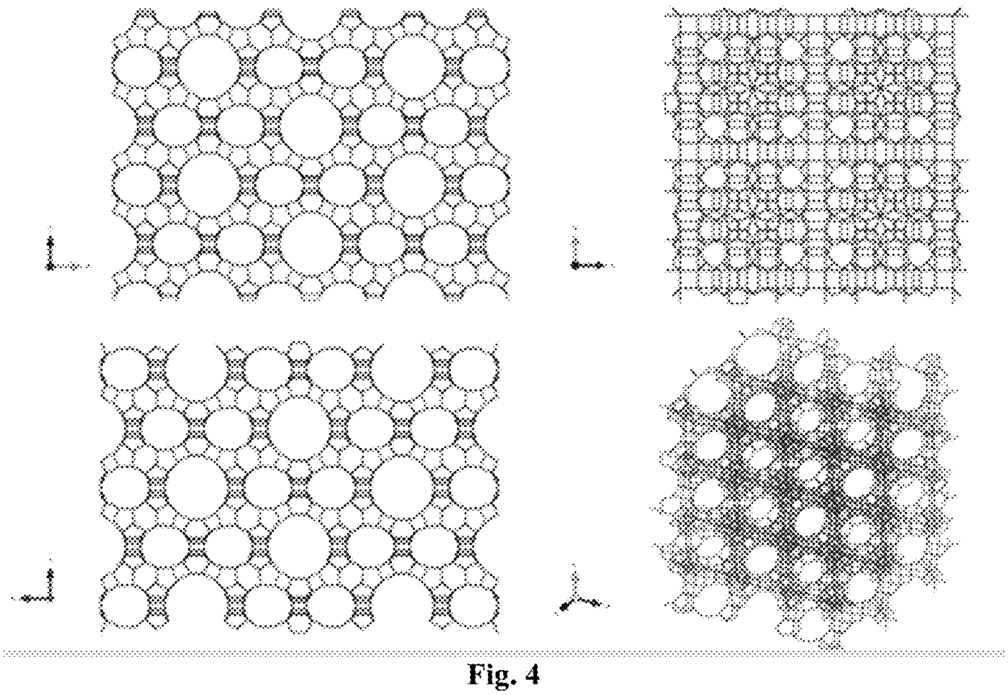
FIG. 4 is a diagram of the channel structure of the ZEO-1 molecular sieve of the present invention.

The crystal structure of the ZEO-1 molecular sieve of the present invention is shown in FIG. 4. It can be seen from FIG. 4 that in both the a-axis direction and b-axis direction of the ZEO-1 crystal structure, there are penetrating 16- and 12-membered ring channels. In addition, there are 16- and 12-membered ring channels in the direction near the (a+b+c) axis of the ZEO-1 crystal structure. Therefore, the structure is described as a three-dimensional intersecting channel system of (16+12)×(16+12)×(16+12)-membered rings.

The ZEO-1 molecular sieve of the present invention is subjected to structural analysis and topology analysis. The molecular sieve framework structure has 21 topologically independent T atoms, 43 topologically different edges (lines constituted by adjacent T atom and T atom), 41 topologically different planes (planes constituted by T atoms), and 19 topologically different tiles constituted by T atoms. Among them, the topological properties (including coordination sequences and vertex symbols) of the 21 topologically independent T atoms of the framework structure of the ZEO-1 material are shown in Table 1.

Among the 19 different tiles in the framework structure of the ZEO-1 molecular sieve, there are three kinds of supercage structures, that is, the first supercage structure built by four 16-membered ring, the second supercage structure with two 16-membered ring and two 12-membered ring, and the third supercage structure containing four 12-membered ring. Compared with the supercage in Zeolite Y (structure code: FAU) which has four 12-membered ring (this supercage is also the important catalytic center of Zeolite Y), ZEO-1 has larger pore size, a larger available volume and a richer channel diversity.

The ZEO-1 molecular sieve of the present invention after calcining has a chemical composition of $(TiO_2)_y(HAO_2)_x \cdot SiO_2$, wherein A is a boron group element, preferably Al or B, $0 \le x \le 1.0$, preferably $0 \le x \le 0.5$, more preferably $0 \le x < 0.2$, most preferably $0.01 \le x \le 0.1$, $0 \le y < 0.2$, preferably $0.01 \le y \le 0.1$.

Figure 2:
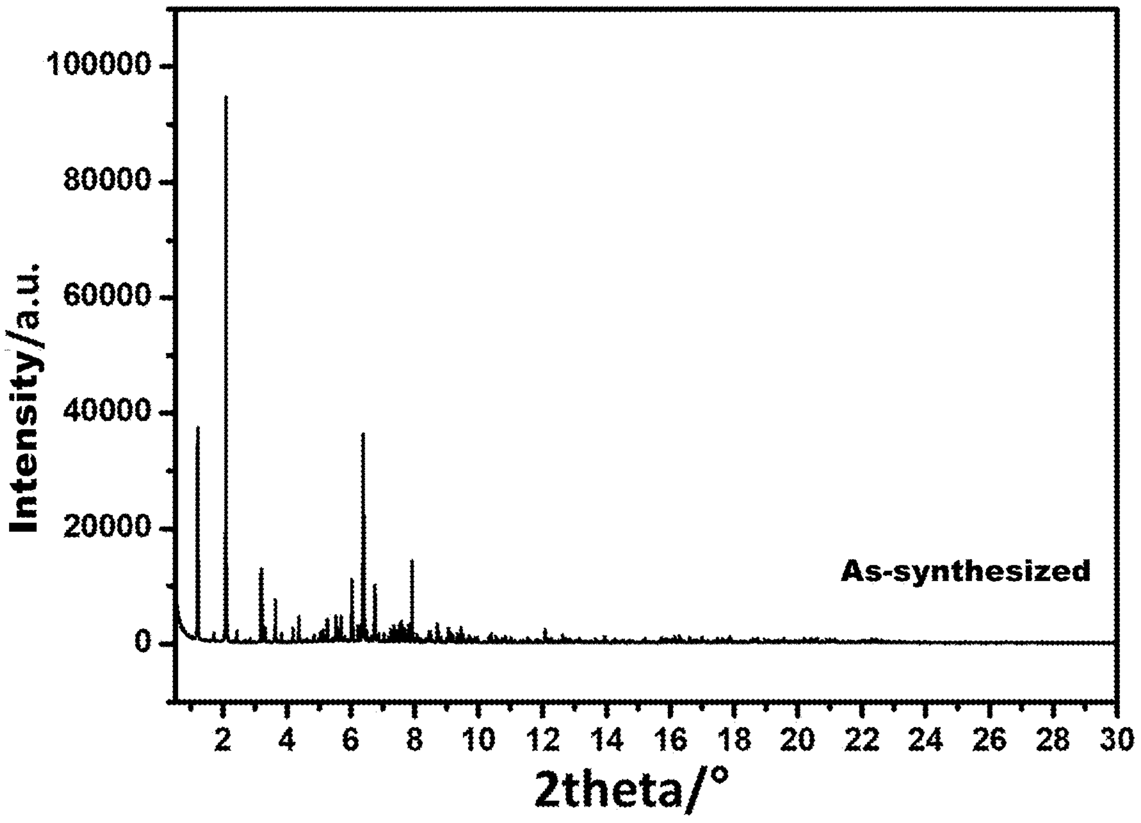
FIG. 2 is an X-ray diffraction pattern of the ZEO-1 molecular sieve as-synthesized with no introduction of titanium in the present invention (synchrotron radiation with wavelength 0.457926 angstroms).

After being calcined in air at 1000° C. for 3 hours to remove molecules of the template, the ZEO-1 molecular sieve of the present invention still maintains a stable framework (as shown in FIG. 2), which shows a better stability compared with the other reported extra-large pore molecular sieve materials. Meanwhile, heteroatoms such as aluminum, boron and the like can be directly introduced into the framework of the molecular sieve. These characteristics endow the molecular sieve material with potential application prospects in the fields of adsorption, separation, catalysis, etc.

Figure 1:
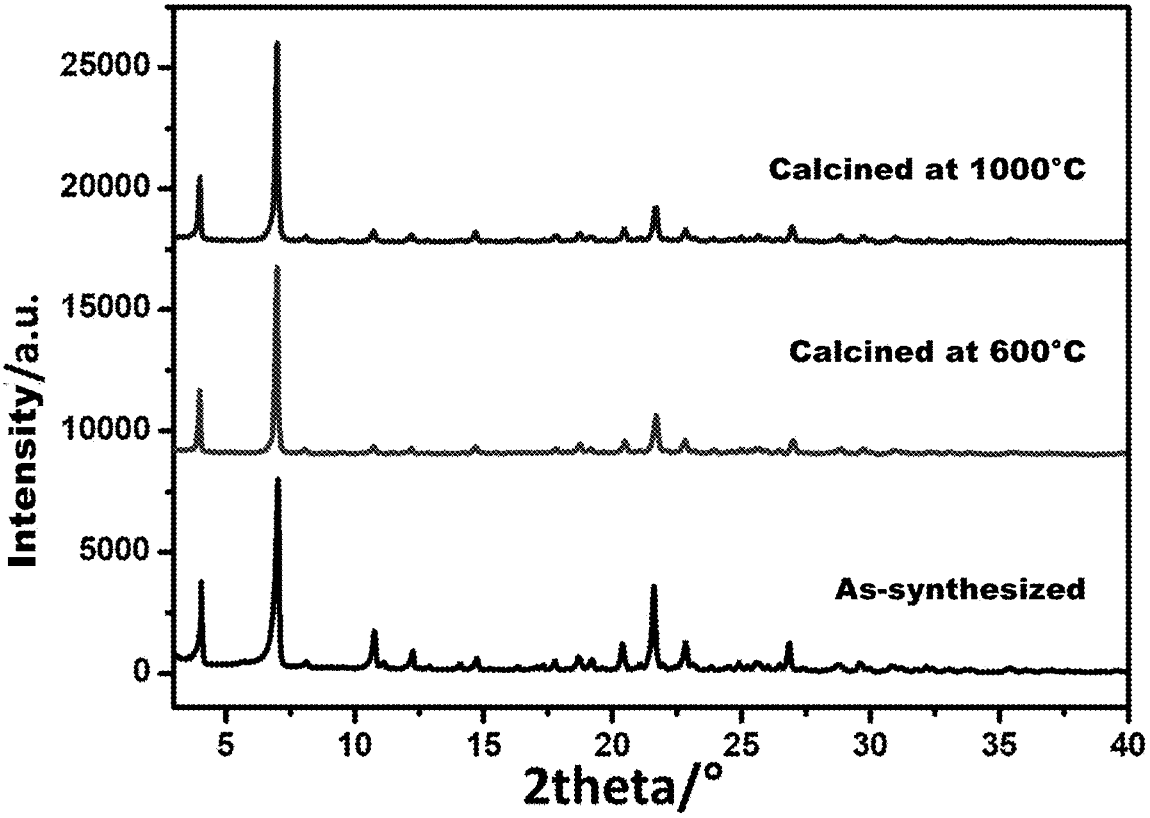
FIG. 1 is an X-ray powder diffraction pattern of the ZEO-1 molecular sieve with no introduction of titanium in the present invention before and after calcination at temperatures of 600° C. and 1000° C. to remove the template (Wavelength: Cu Kα).
Figure 5:
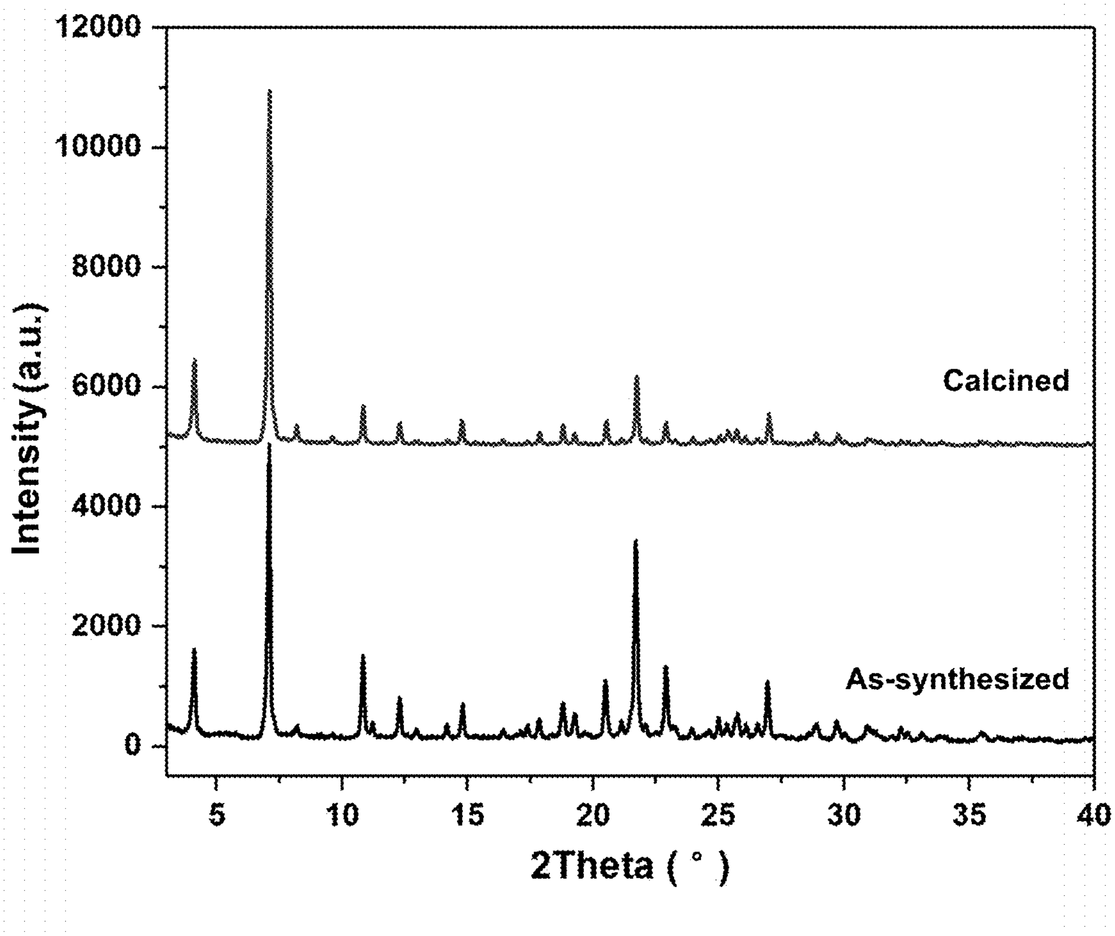
FIG. 5 is an X-ray diffraction pattern of the titanosilicate ZEO-1 molecular sieve (in-situ synthesized sample and the calcined one) of the present invention (Wavelength: Cu Kα).

The X-ray diffraction pattern of the titanium-containing ZEO-1 molecular sieve of the present invention is shown in FIG. 5. Comparing with the X-ray diffraction pattern of the ZEO-1 molecular sieve in FIG. 1, similar position and intensity of the diffraction peaks can be observed, indicating that the obtained titanosilicate material possesses the structure of ZEO-1 zeolite.

Figure 6:
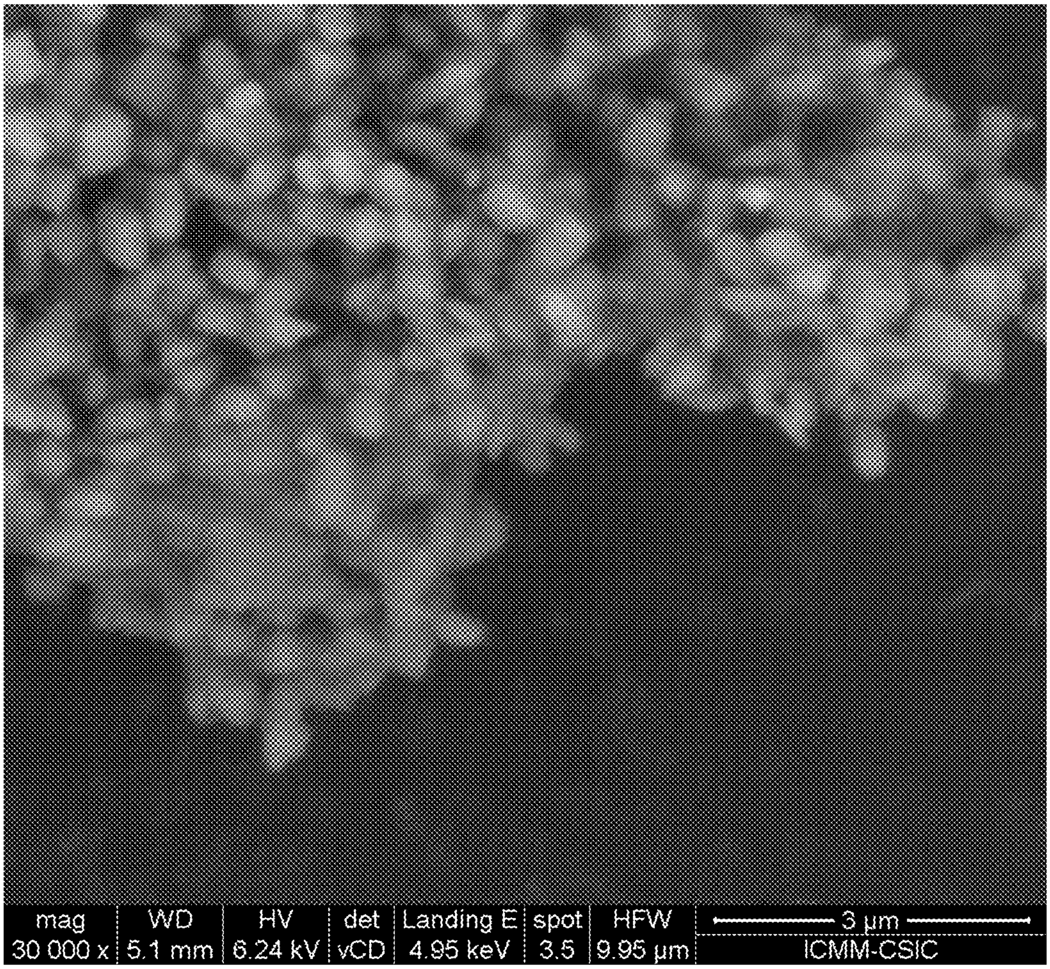
FIG. 6 is a scanning electron micrograph (SEM) of the titanosilicate ZEO-1 molecular sieve of the present invention.
Figure 7:
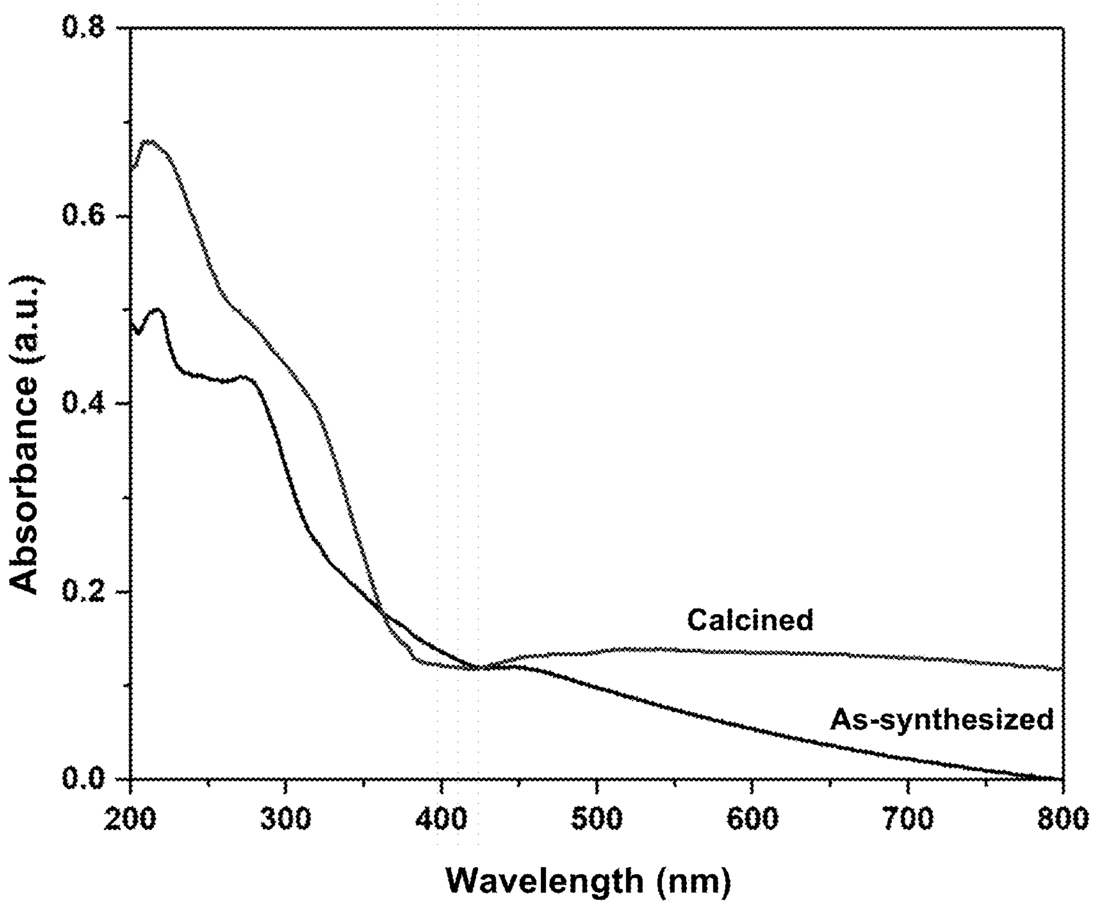
FIG. 7 is the ultraviolet spectrogram of the titanosilicate ZEO-1 molecular sieve (in-situ synthesized sample and the calcined one) of the present invention.

The SEM images of the titanium-containing ZEO-1 molecular sieve of the present invention are shown in FIG. 6, which indicates that the as-synthesized titanium-containing ZEO-1 molecular sieve has uniform particle size and good crystallinity without impurities such as amorphous compounds or anatase. Its ultraviolet-visible spectrum is shown in FIG. 7. The titanium-containing ZEO-1 molecular sieves before and after calcination both have a strong absorption peak at about 220 nm, corresponding to the Ti atom in tetra-coordinated state in the molecular sieve framework, proving that Ti atoms have been successfully introduced into the ZEO-1 molecular sieve framework.

In the method for the preparation of the ZEO-1 molecular sieve of the present invention, specific examples of the organic templates include but are not limited to any one or more shown in the following Table 3:

TABLE 3

| Examples of organic templates | |
|---|---|
| No. | Structural diagram |
| 1 | 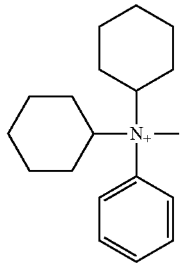 [SMILES: C[N+](c1ccccc1)(C1CCCCC1)C1CCCCC1] |

TABLE 3-continued

| Examples of organic templates | |
|---|---|
| No. | Structural diagram |
| 2 | 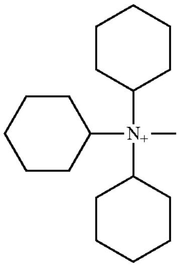 [SMILES: C[N+](C1CCCCC1)(C1CCCCC1)C1CCCCC1] |
| 3 | 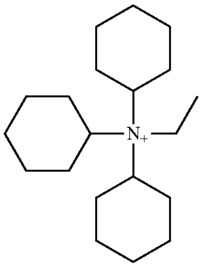 [SMILES: CC[N+](C1CCCCC1)(C1CCCCC1)C1CCCCC1] |
| 4 | 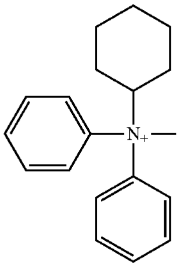 [SMILES: C[N+](c1ccccc1)(c1ccccc1)C1CCCCC1] |
| 5 | 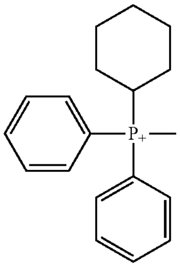 [SMILES: C[P+](c1ccccc1)(c1ccccc1)C1CCCCC1] |
| 6 | 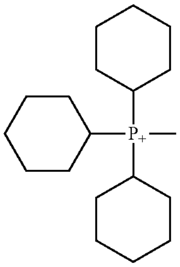 [SMILES: C[P+](C1CCCCC1)(C1CCCCC1)C1CCCCC1] |
| 7 | 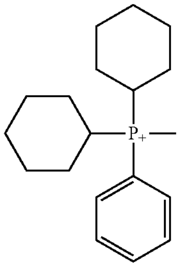 [SMILES: C[P+](c1ccccc1)(C1CCCCC1)C1CCCCC1] |
| 8 | 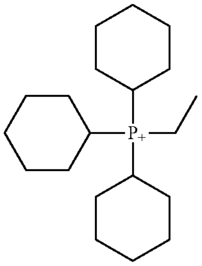 [SMILES: CC[P+](C1CCCCC1)(C1CCCCC1)C1CCCCC1] |

The organic template is preferably any one or more selected from the group consisting of template 1, template 6, template 7 and template 8, more preferably any one or more selected from the group consisting of template 6 and template 8.

The method for the synthesis of the ZEO-1 molecular sieve of the present invention more specifically comprises:

(1) under static or dynamic stirring, a silicon source, a boron group element compound, an organic template, water, a mineralizer and optionally a titanium source were mixed uniformly in proportions and a reaction gel was formed with a chemical composition of $rROH:aHF:yTiO_2:xA_2O_3:SiO_2:wH_2O$, wherein R represents the organic template cation; A is a boron group element, preferably Al or B; the corresponding value intervals of r, a, x and w are: r=0.1-5.0, a=0-5.0, x=0-1.0, y=0-0.2. w=1-100, preferably r=0.1-5.0, a=0-5.0, x=0-0.1, y=0-0.2, w=1-100, more preferably r=0.1-2.0, a=0-2.0, x=0.005-0.05, y=0.01-0.1, w=5-30;

(2) the reaction gel was placed under an infrared lamp or in an oven in order to remove the excess solvent, then the gel was transferred into a stainless steel autoclave at a temperature of 80-240° C., preferably 120-220° C., for 1-60 days, preferably 2-45 days, under sealed condition for crystallization;

(3) after crystallization, after washing, centrifuging, and drying to get the as-synthesized product. The as-synthesized sample was then calcined for 2-5 hours in air at 400-650° C. to remove the template.

The silicon source can be at least one selected from the group consisting of silicic acid, silica gel, silica sol, tetraalkyl orthosilicate and water glass, preferably water glass, silica sol or tetraethyl orthosilicate. The boron group element compound can be at least one selected from the group consisting of sodium metaaluminate, aluminum isopropoxide, aluminum sulfate hexadecahydrate, aluminum hydroxide and boric acid, preferably sodium metaaluminate, aluminum isopropoxide, aluminum sulfate hexadecahydrate or boric acid. The titanium source can be one or a mixture of two or more of tetrabutyl orthotitanate, titanium tetrachloride, titanium trichloride, and titanium sulfate. The mineralizer can be $OH^-$ from an alkaline solution of the organic template, or $F^-$ from additionally added HF or $NH_4F$. The addition of a mineralizer can speed up the crystallization of molecular sieve and may be beneficial for structure direction. The preparation method of the present invention can obtain the ZEO-1 molecular sieve of the present invention under both neutral condition (using $F^-$ as the mineralizer) and alkaline condition (HF free, using $OH^-$ as the mineralizer).

In the preparation method of the present invention, germanium or germanium-containing compounds are not used.

The various materials can be added and mixed in any order. For example, firstly a boron group element (such as Al or B) can be added to an obtained alkaline solution of template to be stirred and dissolved, and then a suitable silicon source and titanium source can be added. If necessary, a mineralizer is added after being stirred uniformly, and the materials are heated under an infrared lamp or in an oven to remove the excess solvent in the system to obtain a target gel.

Before the preparation of the reaction gel, all of the organic cationic templates can be exchanged into the hydroxide form via an ion exchange resin, and their concentration is calibrated by 0.1M hydrochloric acid solution for later use, or they may be introduced directly in the form of a chloride salt, a bromide salt or an iodide salt.

In step (2), the temperature of the oven may be, for example, 80° C.

Crystallization conditions may include, for example: crystallization temperature of 80° C. to 240° C., preferably 120° C. to 220° C., more preferably 140° C. to 210° C.; and crystallization time of 1 to 60 days, preferably 2 to 45 days, more preferably 3 to 30 days.

The mixture in the preparation method of the present invention may further comprise a seed crystal. The content of the seed crystal may be 0.01 ppm by weight to 10000 ppm by weight. The ZEO-1 molecular sieve of the present invention can be used as seed crystal. The presence of the seed crystal can speed up the reaction process and reduce the reaction cost.

In step (3), washing, centrifuging and drying can be performed in any manner conventionally known in the art. For example, washing can be performed multiple times with water or ethanol; and drying can be done by oven drying.

EXAMPLES

In order to illustrate the present invention more clearly, the following examples are provided. These examples do not limit the protection scope of the present invention in any way.

Example 1: Synthesis of Template

Template 6 was taken as an example to illustrate the general process for the synthesis of a template. 28.04 g of tricyclohexylphosphine and 150 ml of acetonitrile were mixed in a 250 ml round bottom flask. At room temperature, 21.29 g of methyl iodide was added dropwise to the mixture. The system was kept for two days under stirring at room temperature, and the solvent was removed from the mixture by rotary evaporation to obtain a crude product, which was recrystallized with ethanol to obtain 40.55 g of product, with a yield of 96%.The product was characterized by liquid NMR ($D_2O$) and electrospray mass spectrometry, and confirmed to be the target compound.

The resulting product was dispersed in 400 mL of deionized water, and the pretreated 717 strong base-type anion exchange resin (manufacturer: Sinopharm Group, China) was used for anion exchange in a column in order to obtained aqueous solution of template agent 6. An appropriate amount of this solution was weighed, and titrated with a 0.1 mol/L solution of hydrochloric acid, using phenolphthalein as an indicator. The titrated structure confirmed an exchange ratio from iodide salt to hydroxide radical up to 97%.

Example 2: Preparation of ZEO-1 Molecular Sieve

Example 2-1

According to the molar ratio of 0.5 ROH:0.5 HF:0.01 $Al_2O_3$:$SiO_2$:5 $H_2O$, a gel for the synthesis of molecular sieve was prepared by the following steps: an appropriate amount of the solution of template in Example 1 after exchange was weighed, 0.04 mmol (0.008 g) of aluminum isopropoxide powder was add thereto, and stirred for about half an hour, and then 2 mmol (0.417 g) of tetraethyl orthosilicate was added, and stirred at room temperature for about two hours so that tetraethyl orthosilicate was completely dissolved, followed by adding a corresponding amount of a solution of hydrofluoric acid according to the above ratio and stirring uniformly, the mixed gel was placed under an infrared lamp or in an oven at 80° C., to remove the excess solvent to the theoretical weight. The finally obtained mixture gel was transferred to a 5 mL stainless steel autoclave with Teflon liner, and crystallized at 175° C. for 28 days under sealed condition, the product was washed twice with water and twice with ethanol, and oven dried for use. The product was directly subjected to phase identification by X-ray powder diffraction, and the pattern was confirmed as that of ZEO-1. An appropriate amount of the sample was calcined in a muffle furnace at 600° C. in air for 2 hours to remove the template, the product was washed with water, centrifuged, and dried. The elemental analysis showed that the Si/Al ratio was 20.5, and its molecular formula was $(HAlO_2)_{0.047}\cdot SiO_2$.

Example 2-2

According to the molar ratio of 0.5 ROH:0.5 HF:0.02 $Al_2O_3$:$SiO_2$:7 $H_2O$, a gel for the synthesis of molecular sieve was prepared by the following steps: an appropriate amount of the solution of template in Example 1 after exchange was weighed, 0.08 mmol (0.016 g) of aluminum isopropoxide powder was add thereto, and stirred for about half an hour, and then 2 mmol (0.417 g) of tetraethyl orthosilicate was added, and stirred at room temperature for about two hours so that tetraethyl orthosilicate was completely dissolved, followed by adding a corresponding amount of a solution of hydrofluoric acid according to the above ratio and stirring uniformly, the mixed gel was placed under an infrared lamp or in an oven at 80° C., to remove the excess solvent to the theoretical weight. The finally obtained mixture gel was transferred to a 5 mL stainless steel autoclave with Teflon liner, and crystallized at 190° C. for 7 days under sealed condition, the product was washed twice with water and twice with ethanol, and oven dried for use. The product was directly subjected to phase identification by X-ray powder diffraction, and the pattern was confirmed as that of ZEO-1. An appropriate amount of the sample was calcined in a muffle furnace at 600° C. in air for 2 hours to remove the template, the product was washed with water, centrifuged, and dried. The elemental analysis showed that the Si/Al ratio was 14.6, and its molecular formula was $(HAlO_2)_{0.064}\cdot SiO_2$.

Example 2-3

According to the molar ratio of 0.5 ROH:0.01 $Al_2O_3$:$SiO_2$:10 $H_2O$, a gel for the synthesis of molecular sieve was prepared by the following steps: an appropriate amount of the solution of template in Example 1 after exchange was weighed, 0.04 mmol (0.008 g) of aluminum isopropoxide powder was add thereto, and stirred for about half an hour, and then 2 mmol (0.417 g) of tetraethyl orthosilicate was added, and stirred at room temperature for about two hours so that tetraethyl orthosilicate was completely dissolved, the mixed gel was placed under an infrared lamp or in an oven at 80° C., to remove the excess solvent to the theoretical weight. The finally obtained mixture gel was transferred to a 15 mL stainless steel autoclave with Teflon liner, and crystallized at 175° C. for 30 days under sealed condition, the product was washed twice with water and twice with ethanol, and oven dried for use. The product was directly subjected to phase identification by X-ray powder diffraction, and the pattern was confirmed as that of ZEO-1. An appropriate amount of the sample was calcined in a muffle furnace at 600° C. in air for 2 hours to remove the template, the product was washed with water, centrifuged, and dried. The elemental analysis showed that the Si/Al ratio was 20.8, and its molecular formula was $(HAlO_2)_{0.046}\cdot SiO_2$.

Example 2-4

According to the molar ratio of 0.5 ROH:0.0167 $Al_2O_3$:$SiO_2$:10 $H_2O$, a gel for the synthesis of molecular sieve was prepared by the following steps: an appropriate amount of the solution of template in Example 1 after exchange was weighed, 0.067 mmol (0.013 g) of aluminum isopropoxide powder was add thereto, and stirred for about half an hour, and then 2 mmol (0.417 g) of tetraethyl orthosilicate was added, and stirred at room temperature for about two hours so that tetraethyl orthosilicate was completely dissolved, the mixed gel was placed under an infrared lamp or in an oven at 80° C., to remove the excess solvent to the theoretical weight. The finally obtained mixture gel was transferred to a 15 mL stainless steel autoclave with Teflon liner, and crystallized at 190° C. for 15 days under sealed condition, the product was washed twice with water and twice with ethanol, and oven dried for use. The product was directly subjected to phase identification by X-ray powder diffraction, and its pattern was confirmed as that of ZEO-1. An appropriate amount of the sample was calcined in a muffle furnace at 600° C. in air for 2 hours to remove the template, the product was washed with water, centrifuged, and dried The elemental analysis showed that the Si/Al ratio was 14.5, and its molecular formula was $(HAlO_2)_{0.065}\cdot SiO_2$.

Figure 3:
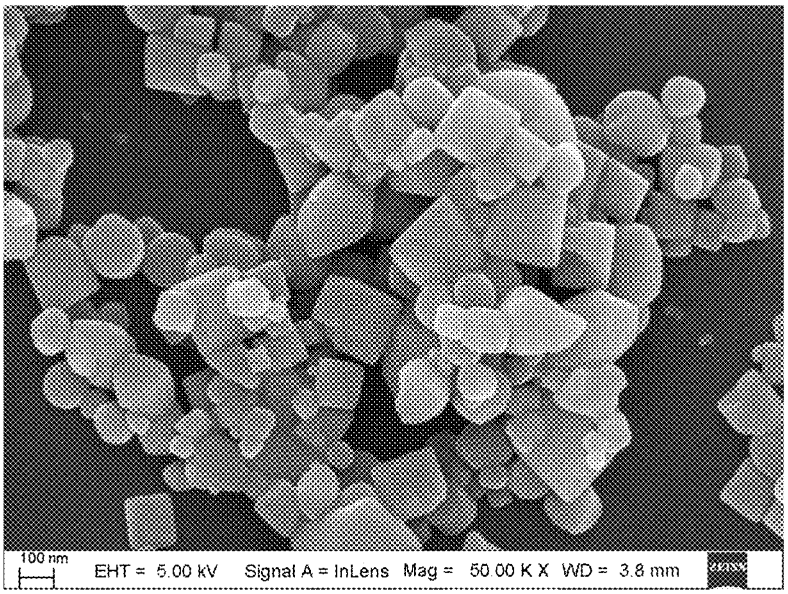
FIG. 3 is a scanning electron micrograph (SEM) of the ZEO-1 molecular sieve with no introduction of titanium in the present invention.

Examples 2-1 to 2-4 all obtained a molecular sieve material with intact structure after calcination (600° C. or 1000° C.), indicating that its structure was stable. The X-ray powder diffraction patterns of the as-synthesized powder sample of the molecular sieve and that after high-temperature calcination were shown in FIG. 1 and FIG. 2. The crystals of ZEO-1 sample with appropriate size was selected, and the scanning electron microscope photograph was shown in FIG. 3.

Example 2-5

The molecular sieves of Examples 2-1 to 2-4 were subjected to continuous rotation electron diffraction (cRED) test, and the structural analysis results showed that the ZEO-1 molecular sieve structure had tetragonal symmetry with $I4_1$/amd space group, the unit cell parameters obtained after refinement of the synchrotron radiation diffraction with a wavelength of 0.457926 angstroms (FIG. 2) were: a=b=43.50217(10) Å, c=24.94918(9) Å, V=47214.8(3) Å$^3$.

Topological analysis was performed using the crystallographic information file (CIF file) obtained after the cRED test. The topological analysis software was based on ToposPro 5.3.0.2, and the analysis process and method were based on the operation manual given on the official website of the software (see ToposPro official website: https://topospro.com/software/).

The analysis results showed that the framework structure of the molecular sieve had 21 topologically independent T atoms, 43 topologically different edges, 41 topologically different planes, and 19 topologically different tiles constituted by T atoms. The more specific topological characteristics of the framework structure of ZEO-1 molecular sieve were shown in Table 2.

Example 3: Preparation of Titanium-Containing ZEO-1 Molecular Sieve

Example 3-1

According to the molar ratio of $SiO_2$:0.02 $Al_2O_3$:0.04 $TiO_2$:0.5 ROH:20 $H_2O$, a gel for the synthesis of molecular sieve was prepared by the following steps: an appropriate amount of the basic solution of template 6 after exchange was weighed, 0.08 mmol (0.016 g) of aluminum isopropoxide powder was add thereto, and stirred for about half an hour, and then 2 mmol (0.417 g) of tetraethyl orthosilicate was added, and stirred at room temperature for about two hours so that tetraethyl orthosilicate was completely dissolved, finally 0.08 mmol (0.027 g) of tetrabutyl orthotitanate was added and stirred overnight, the mixed gel was placed under an infrared lamp or in an oven at 80° C., to remove the excess solvent to the theoretical weight. The finally obtained mixture gel was transferred to a 15 mL stainless steel autoclave with Teflon liner, and crystallized at 190° C. for 30 days under sealed condition, the product was washed twice with water and twice with ethanol, and oven dried for use. The product was directly subjected to phase identification by X-ray powder diffraction, and the pattern was confirmed as that of ZEO-1. An appropriate amount of the sample was calcined in a muffle furnace at 600° C. in air for 2 hours to remove the template, the sample was washed with water and dried. The elemental analysis showed that its molecular formula was $H_{0.04}Al_{0.04}Ti_{0.04}Si_{0.92}O_2$.

Example 3-2

According to the molar ratio of $SiO_2$:0.01 $Al_2O_3$:0.02 $TiO_2$:0.5 ROH:15 $H_2O$, a gel for the synthesis of molecular sieve was prepared by the following steps: an appropriate amount of the basic solution of template 6 after exchange was weighed, 0.04 mmol (0.008 g) of aluminum isopropoxide powder was add thereto, and stirred for about half an hour, and then 2 mmol (0.417 g) of tetraethyl orthosilicate was added, and stirred at normal temperature for about two hours so that tetraethyl orthosilicate was completely dissolved, finally 0.04 mmol (0.014 g) of tetrabutyl orthotitanate was added and stirred overnight, the mixed gel was placed under an infrared lamp or in an oven at 80° C., to remove the excess solvent to the theoretical weight. The finally obtained mixture gel was transferred to a 15 mL stainless steel autoclave with Teflon liner, and crystallized at 175° C. for 30 days under sealed condition, the product was washed twice with water and twice with ethanol, and oven dried for use. The product was directly subjected to phase identification by X-ray powder diffraction, and its pattern was confirmed as that of ZEO-1. An appropriate amount of the sample was calcined in a muffle furnace at 600° C. in air for 2 hours to remove the template, the sample was washed with water and dried. The elemental analysis showed that its molecular formula was $H_{0.02}Al_{0.02}Ti_{0.02}Si_{0.96}O_2$.

Example 3-3

According to the molar ratio of $SiO_2$:0.02 $Al_2O_3$:0.02 $TiO_2$:0.5 ROH:0.5 HF:7 $H_2O$, a gel for the synthesis of molecular sieve was prepared by the following step: an appropriate amount of the basic solution of template 6 after exchange was weighed, 0.08 mmol (0.016 g) of aluminum isopropoxide powder was add thereto, and stirred for about half an hour, and then 2 mmol (0.417 g) of tetraethyl orthosilicate was added, and stirred at room temperature for about two hours so that tetraethyl orthosilicate was completely dissolved, followed by adding 0.04 mmol (0.014 g) of tetrabutyl orthotitanate and stirring overnight, finally a corresponding amount of a hydrofluoric acid solution was added according to the above ratio and stirred uniformly, the mixed gel was placed under an infrared lamp or in an oven at 80° C., to remove the excess solvent to the theoretical weight. The finally obtained mixture gel was transferred to a 15 mL stainless steel autoclave with Teflon liner, and reacted at 175° C. for 30 days under sealed condition, the product was washed twice with water and twice with ethanol, and oven dried for use. The product was directly subjected to phase identification by X-ray powder diffraction, and the pattern was confirmed as which of ZEO-1. An appropriate amount of the sample was calcined in a muffle furnace at 600° C. in air for 2 hours to remove the template, the sample was washed with water and dried The elemental analysis showed that its molecular formula was $H_{0.04}Al_{0.04}Ti_{0.02}Si_{0.94}O_2$.

Example 3-4

According to the molar ratio of $SiO_2$:0.02 $B_2O_3$:0.04 $TiO_2$:0.5 ROH:10 $H_2O$, a gel for the synthesis of molecular sieve was prepared by the following steps: an appropriate amount of the basic solution of template 6 after exchange was weighed, 0.08 mmol (0.005 g) of boric acid was add thereto, and stirred for about half an hour, and then 2 mmol (0.417 g) of tetraethyl orthosilicate was added, and stirred at room temperature for about two hours so that tetraethyl orthosilicate was completely dissolved, finally 0.08 mmol (0.027 g) of tetrabutyl orthotitanate was added and stirred overnight, the mixed gel was placed under an infrared lamp or in an oven at 80° C., to remove the excess solvent to the theoretical weight. The finally obtained mixture gel was transferred to a 15 mL stainless steel autoclave with Teflon liner, and reacted at 190° C. for 30 days under sealed condition, the product was washed twice with water and twice with ethanol, and oven dried for use. The product was directly subjected to phase identification by X-ray powder diffraction, and its pattern was compared and confirmed as which of ZEO-1. An appropriate amount of the sample was calcined in a muffle furnace at 600° C. in air for 2 hours to remove the template, the sample was washed with water and dried. The elemental analysis showed that its molecular formula was $H_{0.04}B_{0.04}Ti_{0.04}Si_{0.92}O_2$.

Example 3-5

According to the molar ratio of $SiO_2$:0.02 $B_2O_3$:0.02 $TiO_2$:0.5 ROH:15 $H_2O$, a gel for the synthesis of molecular sieve was prepared by the following steps: an appropriate amount of the basic solution of template 6 after exchange was weighed, 0.08 mmol (0.005 g) of boric acid was add thereto, and stirred for about half an hour, and then 2 mmol (0.417 g) of tetraethyl orthosilicate was added, and stirred at room temperature for about two hours so that tetraethyl orthosilicate was completely dissolved, finally, 0.04 mmol (0.014 g) of tetrabutyl orthotitanate was added and stirred overnight, the mixed gel was placed under an infrared lamp or in an oven at 80° C., to remove the excess solvent to the theoretical weight. The finally obtained mixture gel was transferred to a 15 mL stainless steel autoclave with Teflon liner, and crystallized at 175° C. for 30 days under sealed condition, the product was washed twice with water and twice with ethanol, and oven dried for use. The product was directly subjected to phase identification by X-ray powder diffraction, and was compared and confirmed as which of ZEO-1. An appropriate amount of the sample was calcined in a muffle furnace at 600° C. in air for 2 hours to remove the template, the sample was washed with water and dried. The elemental analysis showed that its molecular formula was $H_{0.04}B_{0.04}Ti_{0.02}Si_{0.94}O_2$.

The invention claimed is:

1. A silicate molecular sieve comprising a molecular sieve has a chemical composition of $(TiO_2)_y\cdot(HAO_2)_x\cdot SiO_2$, wherein A is a boron group element; $0\leq x\leq 1.0$; $0\leq y<0.2$, and wherein the crystal structure of the molecular sieve has a three-dimensional intersecting channel system of (16+12)×(16+12)×(16+12)-membered rings.

2. The silicate molecular sieve according to claim 1, wherein the framework of the molecular sieve has the topological characteristics shown in the table below

| T atom | Coordination sequences | | | | | | | | | | | |
|---|---|---|---|---|---|---|---|---|---|---|---|---|
| No. | N1 | N2 | N3 | N4 | N5 | N6 | N7 | N8 | N9 | N10 | N11 | N12 | Vertex symbols |
| T1 | 4 | 12 | 17 | 27 | 42 | 62 | 85 | 109 | 136 | 161 | 205 | 247 | 5.5.5.6.5(2).12(4) |
| T2 | 4 | 11 | 18 | 28 | 40 | 62 | 80 | 101 | 131 | 166 | 206 | 258 | 4.5(2).5.5.5.6 |
| T3 | 4 | 9 | 16 | 26 | 41 | 59 | 80 | 106 | 132 | 159 | 201 | 250 | 4.5.4.5.4.12(2) |
| T4 | 4 | 10 | 20 | 29 | 40 | 60 | 88 | 109 | 128 | 166 | 214 | 256 | 4.6.4.12(5).5.6(2) |
| T5 | 4 | 11 | 16 | 25 | 43 | 60 | 84 | 115 | 139 | 161 | 196 | 242 | 4.5.5.6.5.12(4) |
| T6 | 4 | 11 | 18 | 26 | 40 | 63 | 87 | 105 | 128 | 164 | 204 | 250 | 4.5(2).5.6(2).6.6(2) |
| T7 | 4 | 11 | 18 | 28 | 43 | 61 | 80 | 105 | 138 | 165 | 207 | 251 | 4.6(2).5.6.5.12(6) |
| T8 | 4 | 10 | 20 | 29 | 41 | 59 | 85 | 111 | 136 | 170 | 202 | 243 | 4.6.4.12(5).5.5 |
| T9 | 4 | 11 | 18 | 26 | 40 | 60 | 88 | 113 | 132 | 158 | 196 | 250 | 4.5(2).5.5.5.6 |

-continued

| T atom | Coordination sequences | | | | | | | | | | | |
|---|---|---|---|---|---|---|---|---|---|---|---|---|
| No. | N1 | N2 | N3 | N4 | N5 | N6 | N7 | N8 | N9 | N10 | N11 | N12 | Vertex symbols |
| T10 | 4 | 10 | 20 | 30 | 45 | 56 | 79 | 100 | 134 | 174 | 213 | 259 | 4.6.4.12(6).5.5 |
| T11 | 4 | 9 | 17 | 29 | 40 | 58 | 81 | 108 | 141 | 167 | 197 | 238 | 4.4.4.12(5).5.5 |
| T12 | 4 | 9 | 16 | 25 | 39 | 59 | 84 | 116 | 139 | 156 | 194 | 237 | 4.5.4.5.4.16(7) |
| T13 | 4 | 9 | 16 | 25 | 39 | 60 | 85 | 112 | 135 | 157 | 196 | 244 | 4.5.4.6(2).4.12(2) |
| T14 | 4 | 9 | 16 | 25 | 39 | 61 | 88 | 113 | 140 | 168 | 191 | 231 | 4.4.4.6(2).5.16(5) |
| T15 | 4 | 9 | 17 | 28 | 40 | 60 | 85 | 106 | 130 | 163 | 204 | 251 | 4.4.4.12(5).5.6(3) |
| T16 | 4 | 9 | 17 | 30 | 43 | 58 | 73 | 102 | 135 | 167 | 205 | 258 | 4.4.4.12(6).5.5 |
| T17 | 4 | 9 | 16 | 26 | 41 | 62 | 83 | 103 | 132 | 168 | 203 | 247 | 4.4.4.6(2).5.16(5) |
| T18 | 4 | 9 | 16 | 25 | 39 | 63 | 90 | 110 | 132 | 165 | 200 | 240 | 4.4.4.6(2).6(3).16(4) |
| T19 | 4 | 12 | 19 | 30 | 42 | 65 | 76 | 100 | 132 | 175 | 220 | 248 | 5.5.5(2).12(7).6.6 |
| T20 | 4 | 12 | 15 | 24 | 42 | 60 | 92 | 120 | 133 | 155 | 188 | 250 | 5.5.5.5.5(2).16(8) |
| T21 | 4 | 10 | 16 | 25 | 44 | 61 | 78 | 108 | 143 | 163 | 196 | 244 | 4.4.6.6.6(2).12(5) |

3. The silicate molecular sieve according to claim 1, wherein the molecular sieve has the X-ray powder diffraction characteristics shown in the table below

| d-Spacing (Å) | Relative intensity |
|---|---|
| 21.64 ± 0.27 | m |
| 15.33 ± 0.13 | w |
| 12.62 ± 0.09 | vs |
| 10.87 ± 0.07 | w |
| 8.25 ± 0.04 | m |
| 7.95 ± 0.04 | w |
| 7.23 ± 0.03 | mw |
| 6.85 ± 0.03 | w |
| 6.28 ± 0.02 | w |
| 6.00 ± 0.02 | w |
| 5.41 ± 0.02 | w |
| 5.20 ± 0.02 | w |
| 5.12 ± 0.01 | w |
| 5.00 ± 0.01 | w |
| 4.75 ± 0.01 | w |
| 4.75 ± 0.01 | w |
| 4.61 ± 0.01 | mw |
| 4.35 ± 0.01 | mw |
| 4.22 ± 0.01 | w |
| 4.11 ± 0.01 | s |
| 4.04 ± 0.01 | w |
| 3.90 ± 0.01 | mw |
| 3.74 ± 0.01 | w |
| 3.57 ± 0.01 | w |
| 3.53 ± 0.01 | w |
| 3.48 ± 0.01 | w |
| 3.47 ± 0.01 | w |
| 3.42 ± 0.01 | w |
| 3.36 ± 0.01 | w |
| 3.32 ± 0.01 | mw |
| 3.10 ± 0.01 | w |
| 3.10 ± 0.01 | w |
| 3.02 ± 0.01 | w |
| 2.90 ± 0.01 | w |
| 2.78 ± 0.01 | w |
| 2.17 ± 0.01 | w. |

4. A method for the synthesis of the silicate molecular sieve according to claim 1, the method comprising:

(1) mixing a silicon source, a boron group element compound, an organic template, water, a mineralizer and optionally a titanium source to obtain a mixture;

(2) crystallizing the mixture;

(3) calcining the crystallized product to remove the template, wherein the organic template has a tetrahedral spatial configuration represented by the following general formula:

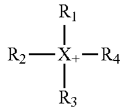

wherein, $R_1$ is cyclohexyl; $R_2$ and $R_3$ are phenyl or cyclohexyl; $R_4$ is $C_{1-8}$ alkyl; X is phosphorus or nitrogen.

5. The method for the synthesis of the silicate molecular sieve to claim 4, wherein the organic template is any one or more selected from the following:

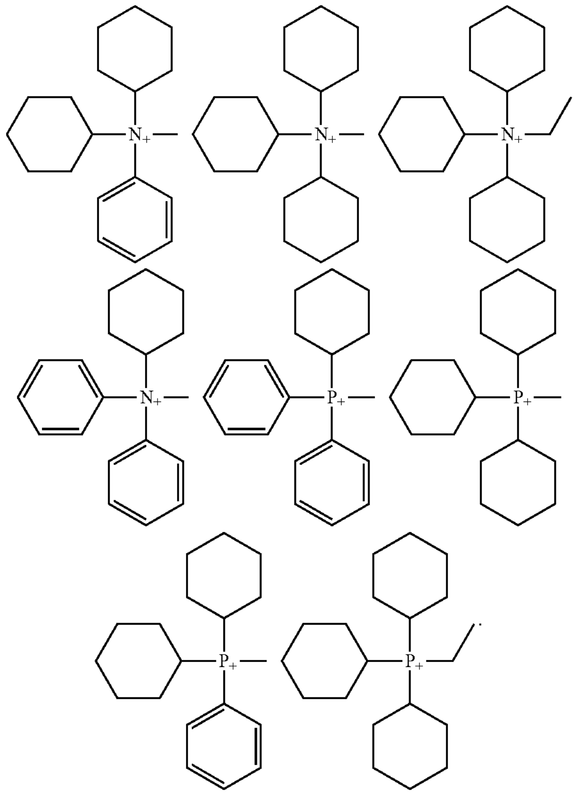

6. The method for the synthesis of the silicate molecular sieve to claim 4, further comprising:

(1) under stirring, mixing a silicon source, a boron group element compound, an organic template, water, a mineralizer and optionally a titanium source uniformly in proportions, and forming a reaction gel by the obtained mixture with a chemical composition of rROH:aHF: $yTiO_2:xA_2O_3:SiO_2:wH_2O$, wherein R represents the positive charge group of the organic template; A is a boron group element; the corresponding value intervals of r, a, x and w are: r=0.1-5.0, a=0-5.0, x=0-1.0, y=0-0.2, w=1-100;

(2) placing the reaction gel under an infrared lamp or in an oven, after the removal of excess solvent, transferring the reaction gel to a stainless steel autoclave to react for 1-60 days, under sealed condition and at a temperature of 80-240° C., for crystallization;

(3) after washing and drying the crystallized product, calcining it for 2-5 hours in an air atmosphere at 400-650° C. to remove the template.

7. The method for the synthesis of the silicate molecular sieve to claim 4, wherein the silicon source is at least one selected from the group consisting of silicic acid, silica gel, silica sol, tetraalkyl orthosilicate and water glass.

8. The method for the synthesis of the silicate molecular sieve to claim 4, wherein the boron group element compound is at least one selected from the group consisting of sodium metaaluminate, aluminum isopropoxide, aluminum sulfate hexadecahydrate, aluminum hydroxide and boric acid.

9. The method for the synthesis of the silicate molecular sieve to claim 4, wherein the titanium source is one or a mixture of two or more of tetrabutyl orthotitanate, titanium tetrachloride, titanium trichloride, and titanium sulfate.

10. The method for the synthesis of the silicate molecular sieve to claim 4, wherein the mineralizer is $OH^-$ from an alkaline aqueous solution of the organic template, or $F^-$ from additionally added HF or $NH_4F$.

11. The method for the synthesis of the silicate molecular sieve to claim 4, wherein crystallization conditions in step (2) include: crystallization temperature of 80 to 240° C.; and crystallization time of 1 to 60 days.

12. The method for the synthesis of the silicate molecular sieve to claim 4, wherein the mixture further comprises a seed crystal.

13. The method for the synthesis of the silicate molecular sieve to claim 12, wherein the seed crystal comprises the silicate molecular sieve having the chemical composition of $(TiO_2)_y\cdot(HAO_2)_x\cdot SiO_2$, wherein A is a boron group element; $0\leq x\leq 1.0$; $0\leq y<0.2$, and wherein the crystal structure of the molecular sieve has the three-dimensional intersecting channel system of (16+12)×(16+12)×(16+12)-membered rings.

14. A molecular sieve composition, comprising the silicate molecular sieve according to claim 1, and a binder.

15. A molecular sieve composition, comprising the silicate molecular sieve synthesized according to the method of claim 4, and a binder.

* * * * *